Jan. 15, 1957 M. J. ZWOSTA ET AL 2,777,452
CLEANING APPARATUS FOR BEER DISPENSING SYSTEMS
Filed Oct. 30, 1952 2 Sheets-Sheet 1

MICHAEL J. ZWOSTA
AND
JOSEPH M. ZWOSTA
INVENTORS

BY
ATTORNEY

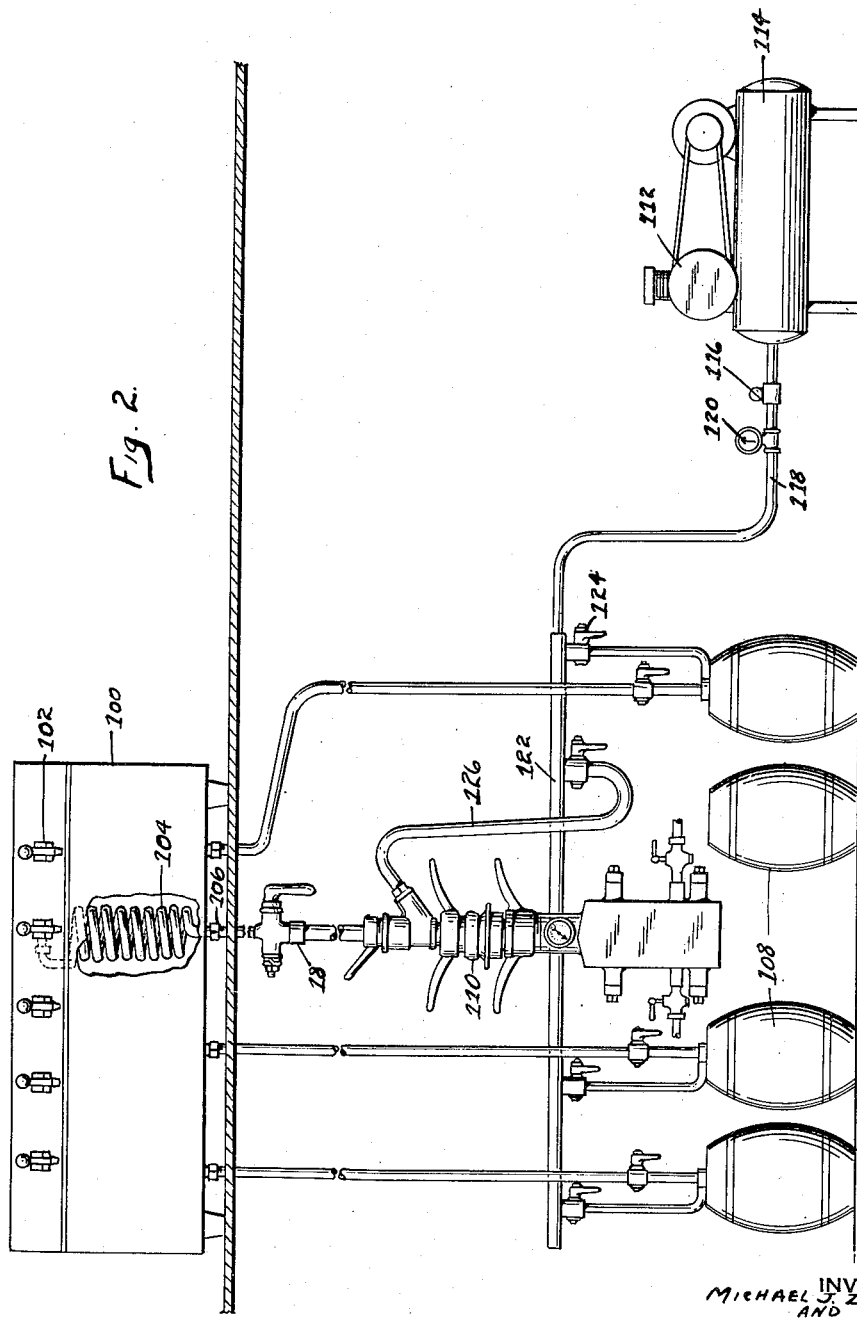

United States Patent Office 2,777,452
Patented Jan. 15, 1957

2,777,452

CLEANING APPARATUS FOR BEER DISPENSING SYSTEMS

Michael J. Zwosta and Joseph M. Zwosta, Brooklyn, N. Y.

Application October 30, 1952, Serial No. 317,792

1 Claim. (Cl. 134—102)

This invention relates to a cleaning device for beer dispensing apparatus.

Many cleaning devices of this general character have been developed and patented and some of them have been used. But there is no cleaning device known to applicants which satisfactorily cleans the entire beer dispensing system, including the rod and peerless tap which projects into the beer barrel.

It is not enough that cleaning means be devised for beer dispensing apparatus which will perform satisfactorily upon the application of sufficient time, labor and skill. What is essential is a cleaning device which will perform satisfactorily in the hands of unskilled employees who are generally reluctant to exert themselves in order to keep the beer lines clean.

There are two requirements, therefore, one relating to the adequacy of the cleaning device and the other relating to the simplicity of its mechanism and the facility with which it may be operated. No beer system cleaning device known to applicants possesses either or both of these two features or requirements.

One of the elements of the beer system which must be kept clean to avoid contamination of the beer is the beer rod which is inserted into the beer keg or barrel. There are some cleaning devices which are adapted to clean the beer rod internally but applicants are not aware of any cleaning device which is adapted to clean the beer rod both externally and internally. The beer rod is exposed both internally and externally to the beer and it makes no sense to clean it either internally or externally but not both internally and externally. Nonetheless, there are no cleaning devices of this general description which are adapted to clean both the inside and the outside of the beer rod. The present device does.

The cleaning device which is herein described and claimed is highly efficient and, what is equally as important, it is extremely simple to use. As has above been indicated, one of the objections to all of the cleaning devices of the prior art related to their complex nature and to the difficulty which was involved in making use of them. The average bartender thought more than twice before using the cleaning devices of the prior art and it was necessary to provide a special cleaning service, operated by an outside or independent company, to keep the beer lines clean. This situation prevails even today.

It is the rare bar which maintains its beer lines in perfectly clean, fresh condition. In the average bar, the beer lines are cleaned at most only several times a month and in many cases the owner of the bar is content when the beer lines are cleaned haphazardly only once a month. The fact of the matter is that a beer line requires cleaning after each keg or barrel of beer is dispensed through it, or at least once a day. It is only in this way that the owner of the bar can assure his customers of a clean, clear and fresh glass of beer. The present apparatus is so simple to use and so efficient in operation that the average bartender will be persuaded to make use of this apparatus at regular and frequent intervals.

The cleaning device herein claimed comprises the following component parts: A mixing chamber which also functions as the cleaning chamber for the beer rod, an inlet port for the water, an inlet port for the compressed air, valves on these two ports, and a tubular receptacle for the beer rod, said tubular receptacle being connected to and in communication with the mixing chamber and being provided with a clamp for locking the beer rod in place both in the tubular receptacle and in the mixing chamber. The tubular receptacle may be removably connected with the mixing chamber and it may be removed therefrom in order to deposit a suitable detergent in the mixing chamber immediately prior to the cleaning operation.

The operation of this device will hereinafter be described in detail but it suffices for present purposes to indicate that the beer rod is connected to the beer line system and when the beer rod is inserted into the tubular receptacle and the mixing chamber, and water and compressed air are allowed to enter said receptacle and said chamber, the detergent is thoroughly agitated and mixed with the water and sent through the beer line system to thoroughly clean the same and the compressed air is sent through the same system to thoroughly blow it out, if desired. Otherwise clean water may be left in the beer lines to act as a cushion for the beer when a new keg is tapped, thus preventing surging of the beer through the line with its ultimate loss through foaming. Since the beer rod is mounted within the tubular receptacle and the mixing chamber during the cleaning operation, it will be cleaned both inside and outside at the same time.

A preferred form of this invention is shown in the accompanying drawing, wherein:

Fig. 2 is a view of a complete beer dispensing system having a plurality of beer lines connected to a plurality of beer barrels and showing one of said lines hooked up to the cleaning device herein described and claimed for the purpose of cleaning it through.

Figure 1:
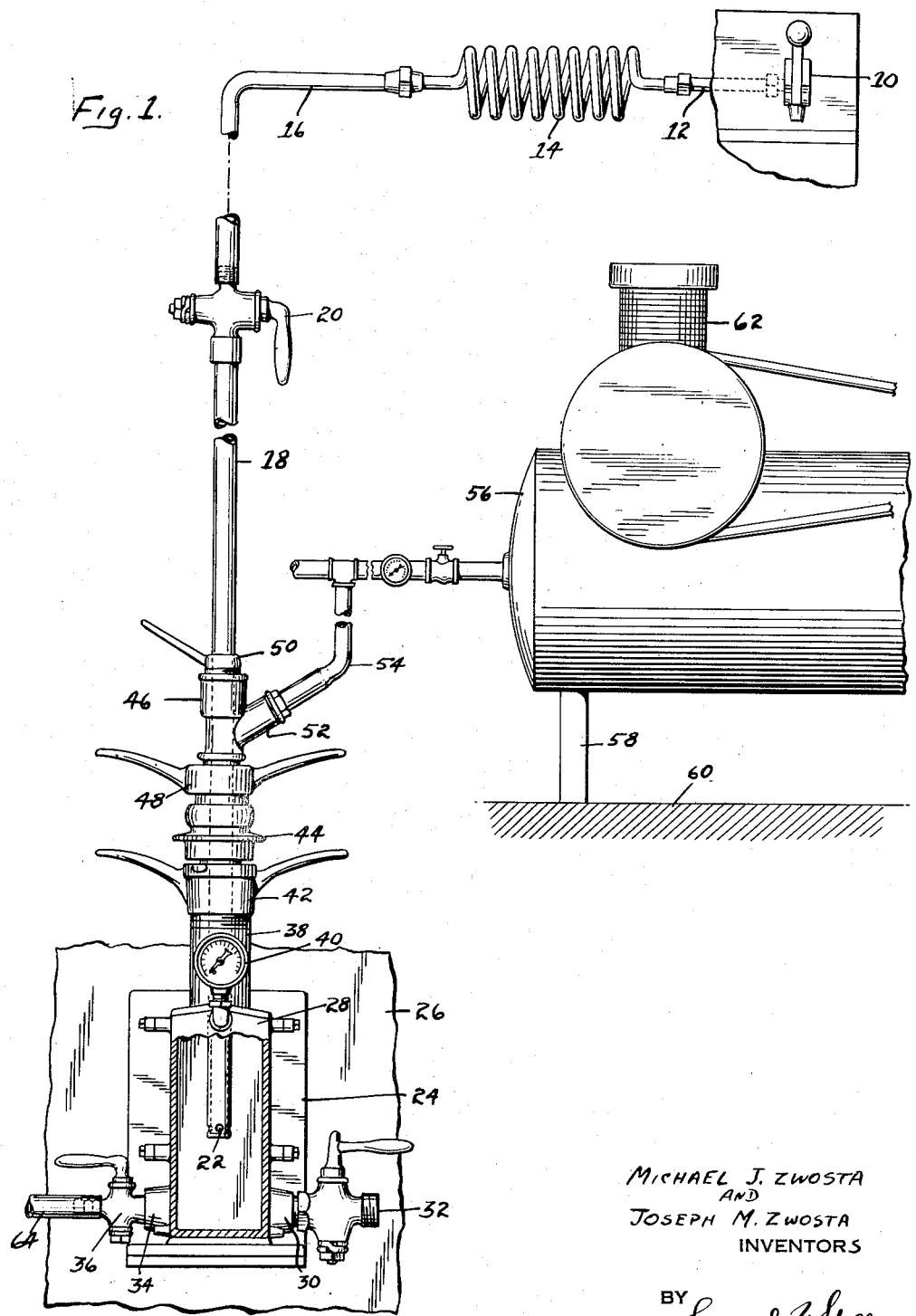
Fig. 1 is a front view thereof, partly diagrammatic, partly broken away and in section and partly fragmentary, showing how the cleaning device herein described and claimed is hooked up to a source of water under pressure, a source of compressed air and a typical beer dispensing system.

A typical beer dispensing system is shown somewhat diagrammatically in the drawing. It includes a dispensing faucet 10 through which the beer is dispensed in the bar room, a connecting pipe 12 which connects the faucet to a cooling coil 14, a second connecting pipe or tube 16 and a beer rod 18, said pipe or tube 16 serving as a connecting link between the beer rod and the cooling coil. It will of course be understood that this is a simplified view of the beer system and many details have been omitted for purposes of clarity. For example, it will be appreciated that the tube or hose which is connected to the beer rod is flexible so as to render it possible to insert the beer rod into one barrel of beer and then to remove it therefrom and to insert it into another barrel of beer and to repeat the procedure as many times as it may be necessary.

A valve 20 is provided at one end of the beer rod, adjacent tube 16. At the opposite end of the beer rod is a plurality of holes 22. The beer rod itself is, of course, tubular in shape and it is closed at its bottom end except for holes 22. It is through these holes that beer is forced up into and through the beer rod and thence into and through tube 16, coil 14, pipe 12 and faucet 10. In order to send the beer through the beer rod, it is necessary to insert the beer rod into a beer barrel. This exposes the outside of the tube as well as the inside to the beer and it renders it necessary to clean both the outside and the inside of the beer rod. The rest of the beer dispensing system need be cleaned only internally since its external surfaces are not exposed to the beer.

The cleaning apparatus herein claimed may be mounted by means of a bracket 24 on a wall 26 or other suitable support in the cellar of the bar or saloon where it is to be used. It consists of a mixing tank or chamber 28, an inlet port 30 through which water under pressure may enter, a valve 32 which controls the flow of water into said mixing tank or chamber, an outlet port 34 which may be used for draining purposes, a valve 36 controlling the flow through said drain port, a tubular receptacle 38 which is connected to said mixing tank and communicates therewith, a pressure gauge 40 on said mixing tank which gauges the pressure within the tank, a screw cap 42 which engages the top of tubular receptacle 38, a screw collar 44 which engages the screw cap 42, a tubular housing 46, a second screw collar 48 which is rotatably mounted on said tubular housing and which is engageable with the first mentioned screw collar 44 to secure the tubular housing to said first mentioned screw collar, and a clamp 50 which is in screw threaded engagement with the tubular housing 46 and which is frictionally engageable with the beer rod as the drawing clearly shows.

Tubular housing 46 is provided with an inlet elbow 52 which is connected by means of a tube 54 to a compressed air tank 56. This tank may be supported by means of legs 58 on floor 60, said floor being in the same cellar where the mixing tank 28 is mounted. Although floor 60 is shown to be elevated above the mixing tank 28, this relationship is not intended to bear any resemblance to a conventional installation. Floor 60 is shown where it is in the drawing solely for purposes of clarity and not to illustrate the relationship which is normally expected to obtain in a typical installation. A motor driven compressor 62 compresses the air in tank 56 and it constitutes the source of compressed air for the cleaning apparatus herein claimed as well as for the beer dispensing system.

When the contents of a given barrel of beer is dispensed in the normal course of business, the beer rod is withdrawn therefrom and good practice then requires that the beer rod and the beer dispensing system to be thoroughly cleaned before another barrel of beer is tapped and its contents dispensed through the same beer rod and the same beer dispensing system. The beer rod should then be inserted through clamp 50, tubular housing 46, tubular collar 44, cap 42, tubular receptacle 38 and into the mixing tank 28. The tubular receptacle 38 may be made as long as the beer rod requires it to be, taking into consideration that cap 42, collar 44 and tubular housing 46 serve, in effect, as extensions of the tubular receptacle 38. What is desired is that a major part of the beer rod be inserted into the mixing tank, the tubular receptacle and its aforementioned extension pieces. These several elements may be made as long as the rod itself or as long as that part of the rod which is inserted into the beer barrel.

Collar 44, collar 48, tubular housing 46 and clamp 50 are all conventional. When the beer rod is inserted through said elements and into the mixing tank as the drawing clearly shows, clamp 50 is actuated to lock the beer rod in place so that it will not be forced out under pressure of the water and air hereinafter mentioned. The faucet is opened and so is valve 32 and a flow of water under pressure is thereby caused to enter the mixing tank, the tubular receptacle 38 and its extension pieces above mentioned and to pass into and through the beer rod and the beer dispensing system. This will tend to clean both the outside and the inside of the beer rod and all of the internal surfaces of the beer dispensing system. Valve 32 may now be closed and drain valve 36 opened. A tube or pipe 64 may connect the drain valve to a suitable disposal system. The valve should be held open long enough to release the pressure in the cleaning chamber and then closed. This will leave water trapped in the beer line above the beer rod valve to act as a cushion for the beer when a new keg is tapped.

It may be desired to clean the beer rod and the beer dispensing system more thoroughly than water alone can do and a detergent should be employed for the purpose. This can be done in the following manner: Cap 42 should be removed from tubular receptacle 38 and the detergent may be poured into the mixing tank through said tubular receptacle. Cap 42 should then be replaced thereon and the rest of the process above described may be repeated. When the water is admitted into the mixing tank it mixes thoroughly with the detergent and the mixture or solution as the case may be is then sent through the beer rod and the beer dispensing system to thoroughly clean the entire apparatus. Valve 32 may be closed to shut off the flow of water and compressed air may then be admitted into the system to blow it through. A suitable valve is provided, but not shown, to control the flow of compressed air into tubular housing 46 and hence into the entire system above described.

The cleaning apparatus above described may also be employed for testing purposes to ascertain whether there are any leaks in the beer dispensing system. This can be done by hooking up the entire system in the manner shown in the drawing and then closing valves 32 and 36 and faucet 10. Compressed air may then be admitted into the system and a reading of the internal pressure in the system may then be taken on pressure gauge 40. The flow of compressed air into the system is then closed off and the gauge is checked again after a suitable time interval has elapsed. Leaks in the system will show up in lower readings on the pressure gauge. This check may also be accomplished with water pressure in the same manner by operating the water inlet valve.

Turning now to Fig. 2, it will be seen that a beer dispensing unit 100 is provided with a plurality of dispensing faucets 102. These faucets are connected in the usual manner to a cooling coil 104 which is connected to a tube 106. This tube is in turn connected to a beer rod 18 and four such beer rods are shown in the drawing. Three of them project into three beer barrels or kegs 108 and the fourth extends into a cleanig device 110 made in accordance with this invention. The details of construction of this device are above set forth.

It will also be noted that there is an air compressor 112 which is mounted on a compressed air tank 114. This compressed air tank feeds compressed air through a valve 116, a pipe 118, a pressure gauge 120 and a manifold 122. There are individual valves 124 on the manifold and these valves control the flow of compressed air through hose 126 into the several beer rods. When the beer rods are inserted into the beer kegs, this pressure forces the beer up through the beer lines and into and through the dispensing faucets. When the beer rod is in the beer cleaning device, this pressure may be used in the manner above described to blow the beer lines through and for all of the other purposes which have above been described.

The foregoing is illustrative of a preferred form of this invention and it will be understood that modifications may be incorporated therein within the broad spirit of the invention and the broad scope of the claim.

We claim:

A cleaning device for a beer dispensing system including a beer rod, said device comprising a mixing tank, an inlet port in said mixing tank, a source of water under pressure, a pipe connecting said source to said inlet port through which water under pressure may enter said mixing tank, a valve controlling the flow through said pipe and inlet port, an outlet port in said mixing tank through which the contents of said tank may be drained out, a valve controlling the flow through said outlet port, a tubular receptacle connected to said mixing tank and communicating therewith, a screw cap engaging the top of said tubular receptacle, a screw collar engaging said screw cap, a tubular housing, a second screw collar rotatably mounted on said tubular housing and engageable with the first mentioned screw collar to secure the tubular housing thereto, and a clamp which is in screw threaded engagement with the tubular housing and which is frictionally engageable with a beer rod which is inserted through said clamp, tubular housing, screw collars, screw cap, tubular receptacle and mixing tank, said tubular receptacle being sufficiently long to receive a major part of said beer rod, said tubular housing being provided with an inlet port, a tube connected to said inlet port and a source of compressed air connected to said tube, whereby air under pressure may be introduced into said tubular housing, tubular receptacle and mixing tank at the same time that water under pressure is introduced therein through the first mentioned inlet port, thereby causing a turbulent mixing of the water and air in and around the beer rod and forcing said turbulent mixture of air and water under pressure through said beer rod and the beer dispensing system connected therewith.

References Cited in the file of this patent

UNITED STATES PATENTS

| | | |
|---|---|---|
| 557,874 | Peters | Apr. 7, 1896 |
| 654,647 | Koppelmann | July 31, 1900 |
| 680,836 | Birkholz | Aug. 20, 1901 |
| 695,323 | Mittinger | Mar. 11, 1902 |
| 1,151,968 | Ray | Aug. 31, 1915 |
| 1,194,542 | Raymond | Aug. 15, 1916 |
| 1,589,721 | Schwaner | June 22, 1926 |
| 2,092,257 | Lewis | Sept. 7, 1937 |
| 2,174,311 | Born | Sept. 26, 1939 |
| 2,386,713 | Pharo | Oct. 9, 1945 |
| 2,450,308 | Smith | Sept. 28, 1948 |